United States Patent
Hayashi

(10) Patent No.: US 9,097,176 B2
(45) Date of Patent: Aug. 4, 2015

(54) SUPERCHARGER CONTROL DEVICE FOR INTERNAL COMBUSTION ENGINE

(75) Inventor: Yuukichi Hayashi, Kawasaki (JP)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/240,119

(22) PCT Filed: Aug. 30, 2012

(86) PCT No.: PCT/JP2012/072062
§ 371 (c)(1),
(2), (4) Date: Feb. 21, 2014

(87) PCT Pub. No.: WO2013/031920
PCT Pub. Date: Mar. 7, 2013

(65) Prior Publication Data
US 2014/0190161 A1    Jul. 10, 2014

(30) Foreign Application Priority Data

Sep. 2, 2011    (JP) .................................. 2011-191728

(51) Int. Cl.
*F02D 23/00*    (2006.01)
*F02B 37/12*    (2006.01)
(Continued)

(52) U.S. Cl.
CPC ................. *F02B 37/12* (2013.01); *F02B 37/18* (2013.01); *F02B 37/183* (2013.01); *F02D 41/0007* (2013.01); *F01N 2240/26* (2013.01); *F02B 2037/122* (2013.01); *Y02T 10/144* (2013.01)

(58) Field of Classification Search
CPC ...... F01N 2240/26; F02B 37/12; F02B 37/18; F02B 37/183; F02D 41/0007; Y02T 10/144

USPC ............................... 60/39.6–39.63, 597–624; 123/559.1–566, 200–249

See application file for complete search history.

(56) References Cited

U.S. PATENT DOCUMENTS

2008/0077304 A1    3/2008    Suzuki et al.
2009/0301084 A1*   12/2009   Lee .................................. 60/602

FOREIGN PATENT DOCUMENTS

DE    198 33 134 C1    11/1999
EP    1 908 937 A1     4/2008
(Continued)

OTHER PUBLICATIONS

International Search Report dated Dec. 4, 2012 with English translation (five (5) pages).

(Continued)

*Primary Examiner* — Jesse Bogue
(74) *Attorney, Agent, or Firm* — Crowell & Moring LLP

(57) ABSTRACT

A turbocharging system of an internal combustion engine includes compressor of a turbocharger disposed on an intake passage of an internal combustion engine and a turbine disposed on an exhaust passage of the internal combustion engine. A bypass passage connects an upstream side and a downstream side of the turbine in the exhaust passage together. A wastegate valve, which is disposed on the bypass passage, opens and closes the bypass passage according to turbocharging pressure of the compressor. An accumulator, which accumulates exhaust gas pressure, is connected to a downstream side of the wastegate valve in the bypass passage. A recirculation passage connects the accumulator and an upstream side of the turbine together, and a recirculation valve, which opens and closes the recirculation passage based on an output request, is deposed on the recirculation passage.

6 Claims, 2 Drawing Sheets

(51) Int. Cl.
*F02B 37/18* (2006.01)
*F02D 41/00* (2006.01)

(56) References Cited

FOREIGN PATENT DOCUMENTS

| JP | 59101538 A | * | 6/1984 | ............. F02B 37/00 |
|---|---|---|---|---|
| JP | 9-144575 A | | 6/1997 | |
| JP | 2007-127099 A | | 5/2007 | |
| JP | 2008-75549 A | | 4/2008 | |
| JP | 2009-270475 A | | 11/2009 | |
| JP | 2010-24967 A | | 2/2010 | |
| JP | 2010-156220 A | | 7/2010 | |
| WO | WO 2010/131370 A1 | | 11/2010 | |

OTHER PUBLICATIONS

Japanese-language Written Opinion (PCT/ISA/237) dated Dec. 4, 2013 (four (4) pages).
Supplementary European Search Report dated May 7, 2015 (One (1) page).

* cited by examiner

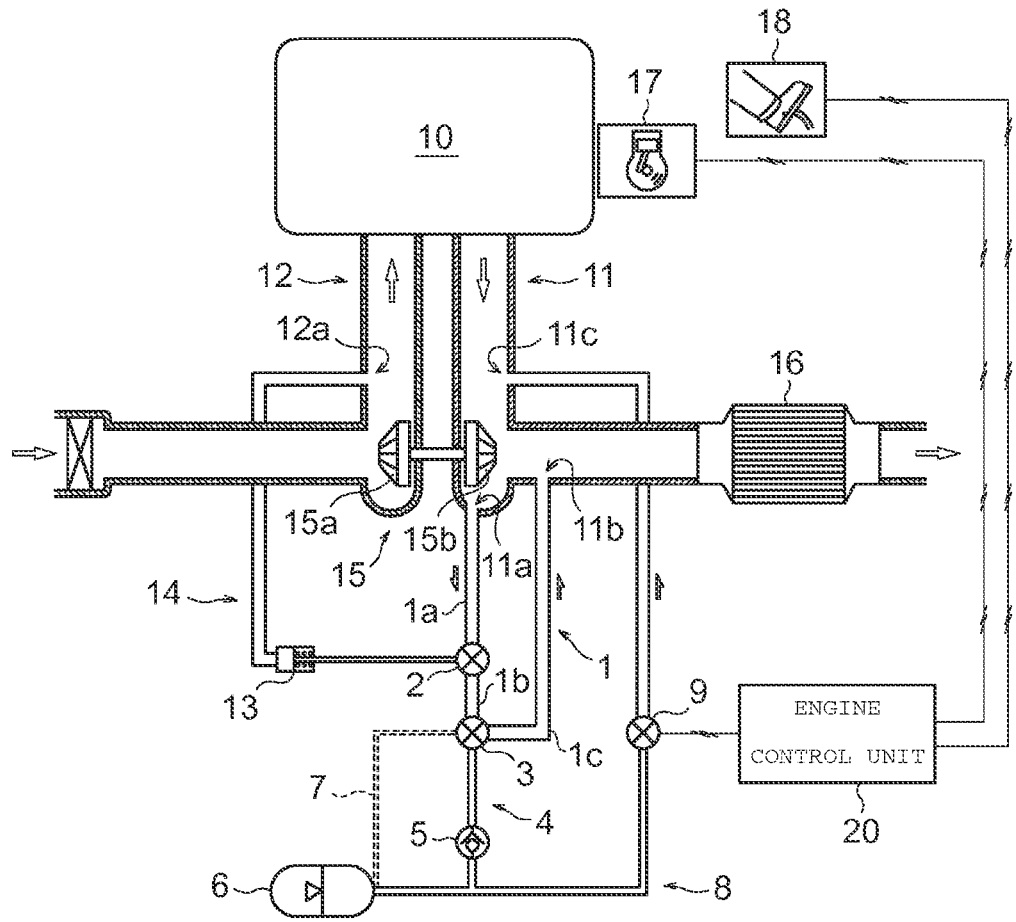

SUPERCHARGER CONTROL DEVICE FOR INTERNAL COMBUSTION ENGINE

TECHNICAL FIELD

The present invention relates to a turbocharging control apparatus that controls the operation of a turbocharger mounted on an internal combustion engine.

BACKGROUND OF THE INVENTION

Conventionally, turbochargers that turbocharge an internal combustion engine using exhaust gas pressure have been widely used. In common turbochargers, a compressor for compressing incoming air and transferring the compressed air into cylinders is provided in an intake passage, and a turbine that rotates upon receiving exhaust gas pressure is provided in an exhaust passage. A rotary shaft of the turbine is connected to a rotary shaft of the compressor, and rotative force of the turbine is used as drive force for the compressor. By increasing the amount of air using exhaust gas pressure, the output of an internal combustion engine can be increased without compromising fuel economy performance.

Techniques for adjusting turbocharging pressure by controlling the RPM of the turbocharger are known. For example, as described in Japanese Laid-Open Patent Publication (Kokai) No. H09-144575, there has been the technique that a bypass passage connects an exhaust passage upstream of the turbine and an exhaust passage downstream of the turbine together, and the path over which exhaust gas is circulated is changed according to the operating state of the internal combustion engine so as to increase or decrease turbocharging pressure.

According to this technique, a wastegate valve whose degree of opening is changeable is disposed on the bypass passage, and the degree of opening of the wastegate valve is controlled according to turbocharging pressure in the intake passage. When the degree of opening of the wastegate valve is increased, the flow rate of exhaust gas detoured around the turbine and discharged from the bypass passage increases, which causes the RPM of the turbine to decrease. In response to this, turbocharging pressure generated by the compressor also decreases. When the degree of opening of the wastegate valve is decreased, the amount of exhaust gas introduced into the turbine increases, which causes the RPM of the turbine to increase and causes turbocharging pressure to increase, too. Thus, the RPM of the turbine can be changed by controlling the degree of opening of the wastegate valve, and even if the flow rate and pressure of exhaust gas from the internal combustion engine are constant, turbocharging pressure can be changed.

Also, as described in Japanese Laid-Open Patent Publication (Kokai) No. H2008-75549, there has also been developed the technique that turbocharging pressure is controlled to increase not only by controlling turbocharging pressure using the wastegate valve but also by assisting driving force of the compressor using an electric motor. The electric motor is disposed on, for example, a rotary shaft connecting the compressor and the turbine together, and configured to transmit both drive force from the turbine and drive force from the electric motor to the compressor. While the RPM of the turbine depends on the circulating state of exhaust gas, the RPM of the electric motor does not depend on the circulating state of exhaust gas. Thus, where drive force from the turbine runs short, stable turbocharging pressure can be ensured by driving the electric motor.

SUMMARY OF THE INVENTION

However, in control of the conventional turbocharger having the wastegate valve, exhaust gas pressure is discharged downstream of the turbine by opening the wastegate valve, and hence energy in discharged exhaust gas cannot be recovered. Namely, that energy is lost, and there is room for improvement in terms of fuel economy performance.

Moreover, during control of turbocharging a vehicle-mounted internal combustion engine, there may be a case where high turbocharging pressure is required when the vehicle is accelerating at startup or running at low RPM and under high load. On the other hand, in an operating state where the flow rate and pressure of exhaust gas from the internal combustion engine have not become large to a sufficient degree, high turbocharging pressure cannot be ensured. In this respect, it may be considered that turbocharging pressure can be ensured by attaching the electric motor to the compressor as described in Japanese Laid-Open Patent Publication (Kokai) No. H2008-75549, but this will make the apparatus configuration complicated and increase manufacturing costs.

The present invention has been made to solve the problems described above, and the present invention provides a turbocharging control apparatus of an internal combustion engine that is capable of improving energy efficiency using a simple construction.

It should be understood that obtaining operational effects resulting from arrangements in an embodiment, to be described later, for practicing the invention and could not be obtained by conventional arts.

Exemplary embodiments of the present invention provide a turbocharging control apparatus that controls operation of a turbocharger having a compressor disposed on an intake passage of an internal combustion engine and a turbine disposed on an exhaust passage of the internal combustion engine, comprising: a bypass passage that connects an upstream side and a downstream side of the turbine in the exhaust passage together; and a wastegate valve that is disposed on the bypass passage and opens and closes the bypass passage according to turbocharging pressure of the compressor.

The turbocharging control apparatus also has an accumulator connected to a downstream side of the wastegate valve in the bypass passage, which accumulates exhaust gas pressure; and a recirculation passage connecting the accumulator and an upstream side of the turbine; and a recirculation valve disposed on the recirculation passage, and which opens and closes the recirculation passage in accordance with an output request.

It is preferred that the turbocharging control apparatus has a three-way valve disposed on the bypass passage downstream of the turbine, and an accumulation passage that connects the accumulator and the three-way valve together. In this case, it is preferred that the three-way valve brings an upstream side of the turbine into one of the accumulation passage and a downstream side of the turbine according to internal pressure of the accumulator.

It is also preferred that the turbocharging control apparatus has a pilot passage through which internal pressure of the accumulator is transmitted to the three-way valve. In this case, it is preferred that when the internal pressure introduced from the pilot passage is not less than a predetermined pressure, the three-way valve brings the upstream side of the turbine into one the downstream side of the turbine, and when the internal pressure introduced from the pilot passage is less than a predetermined pressure, the three-way valve brings the upstream side of the turbine into the accumulation passage.

It is also preferred that the turbocharging control apparatus has a check valve disposed on the accumulation passage.

It is also preferred that the turbocharging control apparatus has a control means for controlling a degree of opening of the recirculation valve. In this case, it is preferred that when the turbocharging pressure is less than a predetermine pressure, and the output request is not less than a predetermined amount, the control means increases the degree of opening of the recirculation valve, and when the turbocharging pressure is not less than the predetermine pressure, and the output request is less than the predetermined amount, the control means decreases the degree of opening of the recirculation valve.

According to the disclosed turbocharging control apparatus of the internal combustion engine, because exhaust gas pressure flowing through the bypass passage accumulated in the accumulator when the wastegate valve is opened, the exhaust gas pressure can be reused, and energy loss can be reduced. Moreover, because exhaust gas pressure can be reused, the output of the internal combustion engine can be increased. In particular, startability and acceleration performance of the vehicle can be improved by reusing exhaust gas pressure when high output is required at startup of the vehicle or during low-speed running where boost pressure is relatively low. Also, exhaust gas performance and engine output can be improved by increasing boost pressure.

Moreover, because the three-way valve is provided, the direction in which exhaust gas pressure introduced from the bypass passage into the accumulator is circulated can be controlled, and the pressure accumulating function can be added without compromising the functions of the conventional wastegate valve.

Moreover, because the passages that are in communication with each other in the three-way valve can be changed according to the internal pressure of the accumulator, exhaust gas pressure can be reliably accumulated to a predetermined pressure, and exhaust gas pressure for reuse can be ensured.

Moreover, backflow from the accumulator toward the three-way valve can be prevented, and exhaust gas pressure can be reliably accumulated in the accumulator.

Moreover, because the degree of opening of the recirculation valve is increased in an operating state where turbocharging by the turbocharger is insufficient, engine output appropriate to an output request can be ensured. As a result, vehicle startability, exhaust gas, and fuel economy can be improved.

BRIEF DESCRIPTION OF DRAWINGS

FIG. 1 is a diagram schematically showing an overall arrangement of an internal combustion engine to which a turbocharging control apparatus according to an embodiment of the present invention is applied.

FIGS. 2(a) and 2(b) are diagrams explaining how a three-way valve operates, in which FIG. 2(a) shows a state in which pilot pressure is less than a predetermined pressure PMAX, and FIG. 2(b) shows a state in which pilot pressure is not less than the predetermined pressure PMAX.

DETAILED DESCRIPTION OF THE INVENTION

Figure 3:
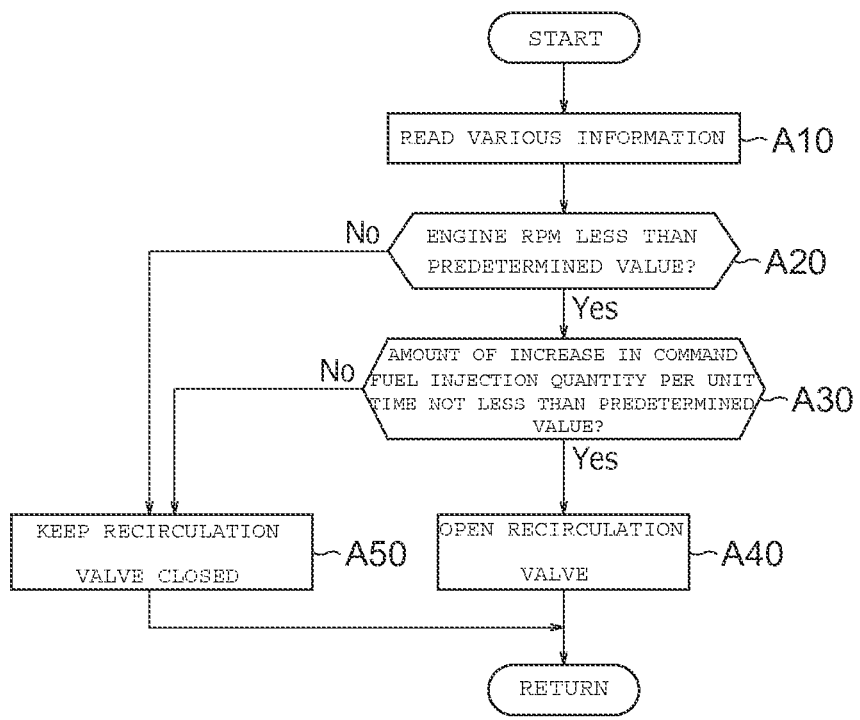
FIG. 3 is a flowchart showing exemplary control performed by the turbocharging control apparatus according to the present embodiment.

A description will now be given of an embodiment of a turbocharging control apparatus according to an embodiment of the present invention with reference to the drawings. However, it should be understood that the embodiment described below is illustrative only, and there is no intention to exclude various changes or adoption of techniques not clearly specified in the following description of the embodiment. Namely, various changes in or to the present embodiment (for example, the embodiment and variations are combined) may be possible without departing from the spirit of the present invention.

1. Apparatus Configuration 1-1. Engine

The turbocharging control apparatus according to the present embodiment is applied to a vehicle-mounted engine 10 (internal combustion engine) illustrated in FIG. 1. As indicated by an open arrow in FIG. 1, the engine 10 introduces air (fresh air, EGR gas, or the like) taken in through an intake passage 12 into cylinders, and discharges exhaust gas burned in the cylinders to an exhaust passage 11. The intake passage 12 and the exhaust passage 11 are connected to an intake manifold and an exhaust manifold, not shown, of the engine 10.

An intake-exhaust system of the engine 10 is provided with a turbocharger 15 that turbocharges the engine 10 using pressure of exhaust gas circulated through the exhaust passage 11. The turbocharger 15, which is disposed in such a manner as to lie astride both the intake passage 12 and the exhaust passage 11, has a compressor 15a that is disposed inside the intake passage 12, and a turbine 15b disposed in the exhaust passage 11. A rotary shaft of the compressor 15a is connected to a rotary shaft of the turbine 15b, and their rotation axes correspond to each other.

The turbine 15b rotates upon receiving pressure of exhaust gas circulated through the exhaust passage 11, and transmits its rotating force to the compressor 15a. The compressor 15a is a compressor that compresses air in the intake passage 12 and sends out the compressed air downstream, and the air pressurized here is fed to the cylinders of the engine 10.

An exhaust catalyst 16 for removing various components included in exhaust gas is disposed on the exhaust passage 11. The exhaust catalyst 16 functions to purify, for example, PM (particulate matter) and components such as nitrogen oxides (NOX) and hydrocarbons (HC).

An engine RPM sensor 17 that detects engine RPM is attached to the engine 10. The engine RPM sensor 17 is a sensor that detects, for example, the angular velocity of a crankshaft, and outputs a signal indicative of the angular velocity. An acceleration position sensor 18 that detects the amount by which an acceleration pedal is depressed (the amount of acceleration pedal operation) is provided at an arbitrary location in the vehicle. The amount of acceleration pedal operation is a parameter corresponding to a driver's acceleration request, and that is, equivalent to an output request to the engine 10. Information on the engine RPM and the amount by which the acceleration pedal is depressed detected by the sensors 17 and 18 is transmitted to an engine control unit 20, to be described later.

1-2. Turbocharging Control Circuit

A bypass passage 1 through which exhaust gas is circulated so as to bypass the turbine 15b is formed in the exhaust passage 11. An upstream end of the bypass passage 1 is connected to an upstream hole 11a located upstream of the turbine 15b in exhaust flow. A downstream end of the bypass passage 1 is connected to a downstream hole 11b located downstream of the turbine 15b in exhaust flow.

A wastegate valve 2 is also disposed on the exhaust passage 11. The wastegate valve 2 is a control valve that controls the bypass passage 1 to open and close according to downstream pressure (that is, turbocharging pressure or turbo pressure) of the compressor 15*a*. In the example shown in FIG. 1, the wastegate valve 2 is controlled to open and close by a wastegate actuator 13.

As shown in FIG. 1, the wastegate actuator 13 has the interior thereof partitioned into two chambers by a diaphragm (film body) elastically fixed in a case via an elastic member (rubber, spring, or the like). One end of a turbocharging pressure passage 14 is connected to one of the two chambers, and the other end of the turbocharging pressure passage 14 is connected to a downstream hole 12*a* located downstream of the compressor 15*a* in the intake passage 12. Namely, turbocharging pressure of the compressor 15*a* is introduced into one of the chambers. Thus, the diaphragm of the wastegate actuator 13 presses the elastic member with pressure corresponding to the magnitude of turbocharging pressure to shift its position.

The diaphragm of the wastegate actuator 13 and a valve body of the wastegate valve 2 are connected together by a link member, and the degree of opening of the wastegate valve 2 is controlled according to the position of the diaphragm. Here, the operation of the valve body of the wastegate valve 2 is set such that as turbocharging pressure increases, the degree of opening of the wastegate valve 2 increases, and as turbocharging pressure decreases, the degree of opening of the wastegate valve 2 decreases. Thus, as turbocharging pressure increases, the flow rate of exhaust gas in the bypass passage 1 increases, and as turbocharging pressure decreases, the flow rate of exhaust gas in the bypass passage 1 decreases.

A three-way valve 3 is disposed downstream of the wastegate valve 2 in the bypass passage 1, and an accumulation passage 4 and a pilot passage 7 are connected to the three-way valve 3. In the following description, a section of the bypass passage 1 from the upstream hole 11*a* to the wastegate valve 2 will be referred to as a first bypass passage 1*a*. Also, a section of the bypass passage 1 from the wastegate valve 2 to the three-way valve 3 will be referred to as a second bypass passage 1*b*, and a section of the bypass passage 1 from the three-way valve 3 to the downstream hole 11*b* will be referred to as a third bypass passage 1*c*.

The three-way valve 3 is a direction switching valve disposed at a location at which three passages consisting of the second bypass passage 1*b*, the third bypass passage 1*c*, and the accumulation passage 4 are connected together, and has the function of switching the direction in which exhaust gas flows according to pilot pressure introduced from the pilot passage 7. FIGS. 2(*a*) and 2(*b*) show typical arrangements of the three-way valve 3. Here, there is shown the three-way valve 3 comprised of a hollow cylindrical body 3*a* and a cylindrical ball valve body 3*b* inserted into the hollow cylindrical body 3*a*. Three passages consisting of the second bypass passage 1*b*, the third bypass passage 1*c*, and the accumulation passage 4 are connected to the body 3*a*. A passage connecting these passages 1*b*, 1*c*, and 4 together is formed through the interior of the ball valve body 3*b*. The ball valve body 3*b* is rotatably inserted into the body 3*a*, and flow passages inside the ball valve body 3*b* are changed by changing the rotation angle of the ball valve body 3*b* according to pilot pressure introduced from the pilot passage 7.

It should be noted that the second bypass passage 1*b* is a passage into which exhaust gas flows, and the third bypass passage 1*c* and the accumulation passage 4 are passages from which exhaust gas flows. Namely, the three-way valve 3 functions to bring the second bypass passage 1*b* into communication with one of the third bypass passage 1*c* and the accumulation passage 4.

The third bypass passage 1*c* is a passage for discharging exhaust gas downstream of the turbine 15*b*, and the accumulation passage 4 is a passage for supplying exhaust gas to an accumulator 6. Thus, the destination to which exhaust gas having passed through the wastegate valve 2 flows is determined by the three-way valve 3. The accumulator 6 is an accumulator unit that has an accumulation chamber in which high-pressure exhaust gas is accumulated, and an expansion chamber that expands and contracts according to the internal pressure of the accumulation chamber. In the present embodiment, exhaust gas discharged from the bypass passage 1 is temporarily accumulated in the accumulator 6, and when "exhaust pressure release conditions" are satisfied, exhaust gas is released upstream of the turbine 15*b* of the turbocharger 15, so that energy of exhaust pressure is regenerated to be used. It should be noted that the type of the accumulator 6 may be either a piston type accumulator or a bladder type accumulator The pilot passage 7 is a passage for transmitting internal pressure of the accumulator 6 as pilot pressure for controlling the three-way valve 3. One end of the pilot passage 7 is connected to the three-way valve 3, and the other end of the pilot passage 7 is connected to the accumulator 6.

The relationship between pilot pressure P transmitted via the pilot passage 7 and the operation of the three-way valve 3 will now be described. When the pilot pressure P is less than a predetermined pressure PMAX, the ball valve body 3*b* inserted into the body 3*a* of the three-way valve 3 is set at a position indicated in FIG. 2(*a*), and the second bypass passage 1*b* and the accumulation passage 4 are brought into communication with each other. At this time, the third bypass passage 1*c* is closed.

On the other hand, when pilot pressure P is not less than the predetermined pressure PMAX, the ball valve body 3*b* is set at a position indicated in FIG. 2(*b*), and the second bypass passage 1*b* and the third bypass passage 1*c* are brought into communication with each other. At this time, the accumulation passage 4 is closed. It should be noted that a concrete value of the predetermined pressure PMAX may be arbitrarily set within a range not more than an upper limit to pressure that can be accumulated in the accumulator 6. As the predetermined pressure PMAX increases, energy recovered by the accumulator 6 increases.

A check valve 5 preventing backflow of exhaust gas is disposed part way along the accumulation passage 4. The check valve 5 allows circulation of exhaust gas from the accumulator 6 side to the three-way valve 3 side.

A recirculation passage 8 is formed in a bifurcated manner between the check valve 5 and the accumulator 6. The recirculation passage 8 is a passage having one end connected to the accumulation passage 4 and the other end connected to a second upstream hole 11*c* located upstream of the turbine 15*b* in the exhaust passage 11. The recirculation passage 8 is a passage for exhaust gas accumulated in the accumulator 6 to be reused.

A recirculation valve 9 is disposed part way along the recirculation passage 8. The recirculation valve 9 is an electromagnetic control valve whose degree of opening is controlled by the engine control unit 20, and which is opened when the above-mentioned "exhaust pressure release conditions" are satisfied. In a state where exhaust pressure is accumulated in the accumulator 6, the passage on the accumulator 6 side of the recirculation valve 9 is filled with high-pressure exhaust gas, and hence when the recirculation valve 9 is opened, exhaust gas is suddenly supplied from the second upstream hole 11*c* into the exhaust passage 11.

The engine control unit 20 (control means) is an electronic control unit that controls extensive systems such as a fuel system, an intake-exhaust system, and a valve operating system associated with the engine 10, and configured as an LSI device or an incorporated electronic device having a microprocessor, a ROM, a RAM, and so on integrated therein. Examples of objects controlled by the engine control unit 20 include the quantity of fuel injected from an injector of the engine 10, the injection timing thereof, the valve lift and valve timing of an intake valve and an exhaust valve, the operating state of the turbocharger 15, the operating state of various accessories, the degree of opening of a throttle valve, and the degree of opening of an EGR valve.

In the description of the present embodiment, a detailed description will be given of how the engine control unit 20 controls the recirculation valve 9 for reusing exhaust gas pressure accumulated in the accumulator 6. Other vehicle-mounted electronic control units and various sensors such as the engine RPM sensor 17 and the acceleration position sensor 18 are connected to the engine control unit 20 via in-vehicle communication networks and dedicated communication lines provided in the vehicle. Here, it is determined whether or not the "exhaust pressure release conditions" are satisfied, and according to the determination result, the degree of opening of recirculation valve 9 is controlled. The "exhaust pressure release conditions" are that, for example, conditions (1) and (2) given below are satisfied.

(1) Engine RPM is less than a predetermined value set in advance (low revolution state).

(2) The amount of increase per unit time in command fuel injection quantity based on the amount of acceleration pedal operation or the like is not less than a predetermined amount (acceleration state).

When both of these conditions (1) and (2) are satisfied, a control signal is transmitted from the engine control unit 20 to the recirculation valve 9, causing the recirculation valve 9 to be opened. On the other hand, at least one of the above conditions (1) and (2) is not satisfied, the recirculation valve 9 is kept closed.

2. Flowchart

FIG. 3 is a flowchart showing exemplary control performed by the engine control unit 20.

In step A10, various information is read into the engine control unit 20. For example, information on engine RPM detected by the engine RPM sensor 17 and information on the amount of acceleration pedal operation detected by the acceleration position sensor 18 are input to the engine control unit 20 in this step.

Then, in step A20, it is determined whether or not engine RPM is equal to or less than the predetermined value. Here, it is determined whether or not the condition (1) of the "exhaust pressure release conditions" is satisfied. When this condition is satisfied, the process proceeds to step A30, and when this condition is not satisfied, the process proceeds to step A50.

In the step A10, it is determined whether or not the amount of increase per unit time in command fuel injection quantity based on the amount of acceleration pedal operation or the like is equal to or more than the predetermined amount. Namely, a determination as to an output request is made based on the gradient of increase in command fuel injection quantity. Here, it is determined whether or not the condition (2) of the "exhaust pressure release conditions" is satisfied. When this condition is satisfied, the process proceeds to step A40, and when this condition is not satisfied, the process proceeds to the step A50.

In the step A40, a control signal is output from the engine control unit 20 to the recirculation valve 9, causing the recirculation valve 9 to be opened. As a result, exhaust pressure accumulated in the accumulator 6 is supplied upstream of the turbine 15b, causing the RPM of the turbine 15b to temporarily increase. Therefore, the RPM of the compressor 15a also increases to temporarily boost turbocharging pressure, and thus turbocharging pressure increases.

On the other hand, in the step A50, the recirculation valve 9 is kept closed. Thus, unless the "exhaust pressure release conditions" are satisfied, energy of pressure accumulate in the accumulator 6 is retained.

3. Operation 3-1. When Exhaust Pressure is Recovered

When the internal pressure of the accumulator 6 (that is, pilot pressure P) is less than the predetermined pressure PMAX, the ball valve body 3b of the three-way valve 3 is controlled to the position indicated in FIG. 2(a), and the second bypass passage 1b and the accumulation passage 4 are brought into communication with each other. During normal operation of the engine 10 where turbocharging pressure is relatively small, the wastegate valve 2 is closed.

The turbine 15b of the turbocharger 15 rotates at an RPM corresponding to the flow rate and pressure of exhaust gas in the exhaust passage 11 to drive the compressor 15a. Thus, turbocharging pressure in the intake passage 12 increases as the RPM of the compressor 15a increases. The turbocharging pressure passes through the turbocharging pressure passage 14 from downstream of the compressor 15a to reach the wastegate actuator 13.

When the turbocharging pressure increases, the wastegate valve 2 is opened, and part of exhaust gas in the exhaust passage 11 flows downstream of the compressor 15a from the upstream hole 11a via the bypass passage 1. As a result, the pressure and flow rate of exhaust gas in the vicinity of the turbine 15b decrease, and excessive revolution of the turbine 15b is inhibited. Namely, the RPM of the turbine 15b is inhibited from excessively increasing, and this prevents the turbocharging pressure from excessively increasing.

On the other hand, exhaust gas passing through the bypass passage 1 is circulated toward the accumulation chamber 4 via the three-way valve 3, and passes the check valve 5 to be introduced into the accumulator 6. Exhaust gas in the accumulation chamber 4 is prevented from flowing back toward the three-way valve 3 by the check valve 5. Because the recirculation valve 9 on the recirculation passage 8 is controlled to kept closed, exhaust gas in the accumulation chamber 4 is also prevented from flowing back toward the recirculation passage 8. Therefore, all exhaust pressure in the accumulation chamber 4 is accumulated in the accumulator 6. The internal pressure of the accumulator 6 acts on the ball valve body 3b of the three-way valve 3 via the pilot passage 7, and when the internal pressure of the accumulator 6 is less than the predetermined pressure PMAX, the communication state in the three-way valve 3 is unchanged, and the state illustrated in FIG. 2(a) is maintained.

It should be noted that when turbocharging pressure decreases due to a change in the operating state of the engine 10 before the internal pressure of the accumulator 6 becomes equal to or more than the predetermined pressure PMAX (for example, when engine RPM decreases), the wastegate valve 2 is closed by operation of the wastegate actuator 13, and thus pressure accumulation is stopped. However, the communication state in the three-way valve 3 is maintained irrespective of whether or not the engine 10 is being turbocharged. Namely, the communication state in the three-way valve 3 is maintained even when the engine 10 is not being turbocharged, and hence when turbocharging pressure increases again to open the wastegate valve 2, pressure accumulation is resumed.

3-2. When Pressure Accumulation is Completed

When the accumulator 6 is filled with exhaust gas, and the internal pressure of the accumulator 6 becomes equal to or more than the predetermined pressure PMAX, the ball valve body 3b of the three-way valve 3 is controlled to the position indicated in FIG. 2(b) by pilot pressure P acting on the three-way valve 3 via the pilot passage 7, and the second bypass passage 1b and the third bypass passage 1c are brought into communication with each other. Namely, the flow of exhaust gas toward the accumulation passage 4 is interrupted, and farther pressure accumulation is prohibited.

When the wastegate valve 2 is opened at this time, the upstream hole 11a and the downstream hole 11b of the exhaust passage 11 are brought into communication with each other, and excessive rotation of the turbine 15b is inhibited. Thus, the state of pressure accumulation in the accumulator 6 does not inhibit the exhaust gas bypassing function of the wastegate valve 2.

3-3. When Exhaust Pressure is Reused

For example, when the acceleration pedal is suddenly depressed while the engine 10 is idling, the magnitude of requested acceleration correspond to the amount by which the acceleration pedal is depressed or the like is computed inside the engine control unit 20, and command fuel injection quantity of the engine 10 is controlled so as to obtain engine output according to the acceleration request.

On the other hand, while the engine 10 is idling, the displacement of the engine 10 is relatively small, and exhaust pressure is low. For this reason, the rate of rise in the RPM of the turbine 15b decreases, and turbocharging pressure temporarily runs short. In particular, when load suddenly increases while engine RPM is low (when required turbocharging pressure suddenly increases), the shortage of turbocharging pressure increases, the amount of oxygen associated with in-cylinder combustion runs short, black smoke tends to be generated, and it becomes difficult to ensure sufficient engine output.

However, when the "exhaust pressure release conditions" are satisfied in this operating state, the engine control unit 20 according to the present embodiment opens the recirculation valve 9, causing exhaust gas pressure accumulated in the accumulator 6 to be introduced upstream of the turbine 15b. Namely, when the engine 10 is in the low-revolution state where it is operating at a low RPM less than the predetermined value set in advance, and when the vehicle is in the acceleration state where the amount of increase per unit time in command fuel injection quantity based on the amount of acceleration pedal operation is not less than the predetermined amount, exhaust gas accumulated in the accumulator 6 is reused.

As a result, the rotation speed of the turbine 15b is momentously increased, and turbocharging pressure increases. Thus, a sufficient amount of oxygen associated with in-cylinder combustion can be ensured, generation of black smoke can be prevented, and engine output can be increased.

4. Effect (1) As described above, the turbocharging control apparatus performs control such that exhaust gas pressure flowing through the bypass passage 1 is recovered by the accumulator 6 when the wastegate valve 2 is opened, and as the need arises, the exhaust gas pressure is supplied again upstream of the turbine 15b. This control can reduce energy loss using a simple construction.

Moreover, output of the engine 10 can be increased by reusing exhaust gas pressure. In particular, the startability and acceleration performance of the vehicle can be improved by reusing exhaust gas pressure when high output is required at startup of the vehicle or during low-speed running where turbocharging pressure is relatively low. Also, exhaust gas performance and engine output can be improved by increasing turbocharging pressure.

Further, because the pressure of exhaust gas that is conventionally discharged from the bypass passage 1 without energy recovery is used to assist the rotation of the turbocharger 15, energy efficiency can be improved, and fuel economy performance can be improved as compared to conventional vehicles. Also, as compared to those which perform turbocharging assist using an electric motor, the configuration of the apparatus can be simplified, and satisfactory turbocharging performance can be maintained while costs are reduced.

(2) Moreover, the turbocharging control apparatus described above has the exhaust circuit in which the accumulation passage 4 is formed to branch off from the three-way valve 3 disposed on the bypass passage 1. Thus, the direction in which exhaust gas introduced from the bypass passage 1 into the accumulator 6 is circulated can be easily controlled, and the pressure accumulating function can be added without compromising the functions of the conventional wastegate valve 2.

(3) Moreover, the turbocharging control apparatus described above is provided with the pilot passage 7 through which the internal pressure of the accumulator 6 is transmitted as pilot pressure P for controlling the direction in which exhaust gas is circulated through the three-way valve 3. Thus, which passages are in communication with each other in the three-way valve 3 can be changed according to the state of pressure accumulation in the accumulator 6, and the internal pressure of the accumulator 6 can be reliably increased to the predetermined pressure PMAX.

(4) Moreover, because the check valve 5 is disposed on the accumulation passage 4, backflow of exhaust gas from the accumulator 6 toward the three-way valve 3 can be prevented, and exhaust gas pressure can be reliably accumulated in the accumulator 6.

It should be noted that even in a case where the wastegate valve 2 is closed before the internal pressure of the accumulator 6 becomes equal to or more than the predetermined pressure PMAX (that is, even in a case where the inflow of exhaust gas from the accumulation passage 4 is stopped), exhaust gas in the accumulation passage 4 is prevented from flowing back toward the three-way valve 3 by the check valve 5. Thus, pressure accumulation in the accumulator 6 should not necessarily be completed by one operation, but pressure may be accumulated at a plurality of times.

(5) Moreover, in the turbocharging control apparatus described above, the "exhaust pressure release conditions" are set as conditions for reusing exhaust gas pressure accumulated in the accumulator 6. The "exhaust pressure release conditions" are conditions for determining whether or not turbocharging by the turbocharger 15 is possibly insufficient. Thus, by permitting reuse of exhaust gas pressure when turbocharging by the turbocharger 15 is possibly insufficient, engine output appropriate to an output request can be ensured.

In particular, accumulated pressure is reused when an required output suddenly increase while the engage 10 is rotating at low RPM, startability and acceleration performance in low-speed running regions can be improved to drive feeling and improve exhaust gas and fuel economy.

5. Variations

Although in the above described embodiment, the exhaust circuit that mechanically controls the degree of opening of the wastegate valve 2 according to pressure (that is, turbocharging pressure) in the exhaust passage 12 downstream of the compressor 15a of the turbocharger 15 is illustrated by an example, the concrete arrangement of the wastegate valve 2, the wastegate actuator 13, and so on are not limited to this.

For example, by using not only turbocharging pressure of the compressor 15a (downstream pressure) but also upstream pressure, the wastegate actuator 13 may control the degree of opening of the wastegate valve 2. Alternatively, the wastegate actuator 13 and the wastegate valve 2 of electromagnetic control types may be used. The turbocharging control apparatus described above may be applied to any exhaust circuit as long as it has an arrangement in which a valve is disposed on a route that enables exhaust gas to bypass the turbine 15b, and the degree of opening of the valve is controlled to be open and close according to turbocharging pressure.

Moreover, although in the above described embodiment, the exhaust circuit in which the three-way valve 3 is disposed at a point from which the bypass passage 1 and the accumulation passage 4 branch off is illustrated by an example, a flow rate control valve may be used in place of the three-way valve 3. In this case, it is only necessary to drive a control spool of the flow rate control valve such that the flow rate of exhaust toward the third bypass passage 1c is increased as the internal pressure of the accumulator 5 increases, and the flow rate of exhaust toward the accumulation passage 4 is increased as the internal pressure of the accumulator 5 decreases.

Moreover, although in the above described embodiment, the second upstream hole 11c of the exhaust passage 11 is provided upstream of the turbine 15b, the efficiency with which turbine RPM is increased can be improved by devising the position of the second upstream hole 11c. Specifically, the second upstream hole 11c may be provided at a position at which exhaust gas jetted from the second upstream hole 11c abuts on a rotor blade or vane. This arrangement can further improve turbocharging efficiency.

It should be noted that the "exhaust pressure release conditions" as to which a determination is made by the engine control unit 20 are not limited to those in the embodiment described above. For example, the recirculation valve 9 may be opened when a shortage of turbocharging pressure is detected based on a value detected by a pressure sensor provided downstream of the compressor 15a in the intake passage 12. Alternatively, the recirculation valve 9 may be opened when a controlled value of fuel injection quantity of the engine 10 suddenly increases.

Further, although in the above described embodiment, exhaust pressure of the turbocharger 15 that turbocharges the engine 10 using exhaust gas pressure is recovered, this is not limitative, but exhaust pressure of electric power-assisted turbocharger, a variable capacity turbocharger, or the like may be recovered. The above described turbocharging control apparatus may be applied to any turbocharger as long as it has at least the compressor 15a disposed on the intake passage 12 and the turbine 15b disposed on the exhaust passage 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS LIST

1 Bypass passage
2 Wastegate valve
3 Three-way valve
4 Accumulation passage
5 Check valve
6 Accumulator
7 Pilot passage
8 Recirculation passage
9 Recirculation valve
10 Engine
11 Exhaust passage
11a Upstream hole (upstream side)
11b Downstream hole (downstream side)
11c Second upstream hole (upstream side)
15 Turbocharger
15a Compressor
15b Turbine
20 Engine control unit (control means)

The invention claimed is:

1. A turbocharging control apparatus configured to control operation of a turbocharger having a compressor disposed on an intake passage of an internal combustion engine and a turbine disposed on an exhaust passage of the internal combustion engine, comprising:
a bypass passage connecting an upstream side and a downstream side of the turbine in the exhaust passage together;
a wastegate valve disposed on the bypass passage, wherein the wastegate value is configured to open and close the bypass passage according to turbocharging pressure of the compressor;
an accumulator connected to a downstream side of the wastegate valve in the bypass passage, wherein the accumulator is configured to accumulate exhaust gas pressure;
a recirculation passage connecting the accumulator and an upstream side of the turbine; and
a recirculation valve disposed on the recirculation passage, wherein the recirculation valve opens and closes the recirculation passage in accordance with an output request.

2. The turbocharging control apparatus according to claim 1, further comprising:
a three-way valve disposed on the bypass passage downstream of the turbine; and
an accumulation passage connecting the accumulator and the three-way valve together,
wherein the three-way valve is configured to bring an upstream side of the turbine into one of the accumulation passage and a downstream side of the turbine according to internal pressure of the accumulator.

3. The turbocharging control apparatus according to claim 2, further comprising:
a pilot passage through which internal pressure of the accumulator is transmitted to the three-way valve,
wherein when the internal pressure introduced from the pilot passage is not less than a predetermined pressure the three-way valve brings the upstream side of the turbine into one the downstream side of the turbine, and when the internal pressure introduced from the pilot passage is less than a predetermined pressure the three-way valve brings the upstream side of the turbine into the accumulation passage.

4. The turbocharging control apparatus according to claim 2, further comprising:
a check valve disposed on the accumulation passage.

5. The turbocharging control apparatus according to claim 3, further comprising:
a check valve disposed on the accumulation passage.

6. The turbocharging control apparatus according to claim 1, further comprising:

an electronic control unit configured to control a degree of opening of the recirculation valve, wherein when the turbocharging pressure is less than a predetermine pressure, and the output request is not less than a predetermined amount the electronic control unit increases the degree of opening of the recirculation valve, and when the turbocharging pressure is not less than the predetermine pressure and the output request is less than the predetermined amount the electronic control unit decreases the degree of opening of said recirculation valve.

\* \* \* \* \*